(12) United States Patent
Li et al.

(10) Patent No.: US 10,699,716 B2
(45) Date of Patent: Jun. 30, 2020

(54) ARTIFICIAL INTELLIGENCE-BASED METHOD AND DEVICE FOR VOICEPRINT AUTHENTICATION

(71) Applicant: BAIDU ONLINE NETWORK TECHNOLOGY (BEIJING) CO., LTD., Beijing (CN)

(72) Inventors: Chao Li, Beijing (CN); Xiao Li, Beijing (CN); Bengu Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 169 days.

(21) Appl. No.: 15/757,058

(22) PCT Filed: Jun. 27, 2016

(86) PCT No.: PCT/CN2016/087320
§ 371 (c)(1),
(2) Date: Mar. 2, 2018

(87) PCT Pub. No.: WO2017/113658
PCT Pub. Date: Jul. 6, 2017

(65) Prior Publication Data
US 2018/0277122 A1    Sep. 27, 2018

(30) Foreign Application Priority Data

Dec. 30, 2015 (CN) .......................... 2015 1 1020415

(51) Int. Cl.
*G10L 17/00* (2013.01)
*G10L 17/22* (2013.01)
(Continued)

(52) U.S. Cl.
CPC ............ *G10L 17/22* (2013.01); *G06F 16/686* (2019.01); *G06N 5/022* (2013.01); *G06N 7/005* (2013.01);
(Continued)

(58) Field of Classification Search
None
See application file for complete search history.

(56) References Cited

U.S. PATENT DOCUMENTS 7,454,349 B2 * 11/2008 Teunen .................. G10L 17/04
704/273
9,159,321 B2 * 10/2015 Cheung .................. G10L 15/25
(Continued)

FOREIGN PATENT DOCUMENTS

CN      101447188       6/2009
CN      101833951       9/2010
(Continued)

OTHER PUBLICATIONS

SIPO, Office Action for CN Application No. 201511020415, dated May 2, 2018.
(Continued)

*Primary Examiner* — Satwant K Singh
(74) *Attorney, Agent, or Firm* — Hodgson Russ LLP (57) ABSTRACT

Disclosed are an artificial intelligence-based method and device for voiceprint authentication. The method comprises receiving a registration request of a user and providing a registration string to the user; receiving voice information of the user reading the registration string and producing N segments of voice on the basis of the voice information, where N is a positive integer; determining a gender tag of the user on the basis of a gender classification model and the N
(Continued)

segments of voice; and producing a registration voiceprint model for the user on the basis of the gender tag and the N segments of voice.

17 Claims, 4 Drawing Sheets

(51) Int. Cl.
*G06F 16/68* (2019.01)
*G10L 17/24* (2013.01)
*G06N 7/00* (2006.01)
*G06N 20/10* (2019.01)
*G06N 20/20* (2019.01)
*G06N 5/02* (2006.01)
*G10L 17/04* (2013.01)
*G10L 17/06* (2013.01)
*H04L 29/06* (2006.01)

(52) U.S. Cl.
CPC ............. *G06N 20/10* (2019.01); *G06N 20/20* (2019.01); *G10L 17/04* (2013.01); *G10L 17/06* (2013.01); *G10L 17/24* (2013.01); *H04L 63/0861* (2013.01)

(56) References Cited

U.S. PATENT DOCUMENTS

| | | | | |
|---|---|---|---|---|
| 9,177,131 | B2* | 11/2015 | Zhang | G06F 21/32 |
| 9,258,302 | B2* | 2/2016 | Fu | H04L 63/083 |
| 9,424,837 | B2* | 8/2016 | Talhami | G10L 17/04 |
| 10,140,984 | B2* | 11/2018 | Ye | G10L 15/02 |
| 2016/0372116 | A1* | 12/2016 | Summerfield | G10L 25/63 |
| 2019/0066665 | A1* | 2/2019 | Ye | G10L 15/20 |
| 2019/0341055 | A1* | 11/2019 | Krupka | G10L 25/84 |

FOREIGN PATENT DOCUMENTS

| | | |
|---|---|---|
| CN | 102404287 | 4/2012 |
| CN | 103714817 | 4/2014 |
| CN | 104821934 | 8/2015 |
| CN | 105185379 | 12/2015 |
| EP | 2879130 | 6/2015 |
| KR | 20130007143 | 1/2013 |

OTHER PUBLICATIONS

WIPO, ISR for App. No. PCT/CN2016/087320, Sep. 18, 2016.
Heilongjiang University, Overview of GMM and Voiceprint Recognition, Oct. 15, 2012.

* cited by examiner

ARTIFICIAL INTELLIGENCE-BASED METHOD AND DEVICE FOR VOICEPRINT AUTHENTICATION

CROSS REFERENCE TO RELATED APPLICATION

This application is a U.S. national phase application of International Application No. PCT/CN2016/087320, filed on Jun. 27, 2016, which is based upon and claims a priority to Chinese Patent Application Serial No. 201511020415.6, filed with the Status Intellectual Property Office of P. R. China on Dec. 30, 2015, entitled "Artificial Intelligence-based Method and Device for Voiceprint Authentication", filed by BAIDU ONLINE NETWORK TECHNOLOGY (BEIJING) CO., LTD., the entire contents of which are incorporated herein by reference.

FIELD

The present disclosure relates to a login authentication technology field, and more particularly to a method and an apparatus for voiceprint authentication based on artificial intelligence (AI for short).

BACKGROUND

At present, an identity authentication is mainly performed by inputting an account and a password (or a gesture) by a user in a login system of a website (or a device), and the user may login the system after the identity authentication is successfully accomplished. However, by using the login manner based on the password and the gesture, the user may suffer from security risks once the password or the gesture is leaked out (which means that others can login with the password or the gesture). Furthermore, in order to enhance security, the user generally needs to set different passwords including special characters for different objects, which will undoubtedly put an extra burden of memory on the user.

Therefore, how to simplify login operations for the user and to ensure the login user to be an actual user in a case that the login password is correct has become a problem to be solved urgently.

SUMMARY

Embodiments of the present disclosure seek to solve at least one of the problems existing in the related art to at least some extent.

Accordingly, a first objective of the present disclosure is to provide a method for voiceprint authentication based on artificial intelligence. In a registering process, with the method for voiceprint authentication based on artificial intelligence, a gender tag of the user may be acquired firstly, and a corresponding registration voiceprint model may be generated by using different models according to the gender tag, such that an availability for using a voiceprint password as an authentication manner in a login process may be improved, thereby improving a performance of a voiceprint matching, allowing the user to login via a speech and simplifying operations for the user.

A second objective of the present disclosure is to provide an apparatus for voiceprint authentication based on artificial intelligence.

A third objective of the present disclosure is to provide a terminal.

A fourth objective of the present disclosure is to provide a storage medium.

In order to achieve the above objectives, embodiments of a first aspect of the present disclosure provide a method for voiceprint authentication based on artificial intelligence. The method includes: receiving a registration request of a user, and providing a registration string to the user: receiving voice information of the registration string read by the user, and generating N voice segments based on the voice information, where N is a positive integer; determining a gender tag of the user based on a gender classification model and the N voice segments; and generating a registration voiceprint model for the user based on the gender tag and the N voice segments.

In order to achieve the above objectives, embodiments of a second aspect of the present disclosure provide an apparatus for voiceprint authentication based on artificial intelligence. The apparatus includes: a first receiving module, configured to receive a registration request of a user; a first providing module, configured to provide a registration string to the user; a second receiving module, configured to receive voice information of the registration string read by the user; a first generating module, configured to generate N voice segments based on the voice information, where N is a positive integer; a determining module, configured to determine a gender tag of the user based on a gender classification model and the N voice segments; and a second generating module, configured to generate a registration voiceprint model for the user based on the gender tag and the N voice segments.

In order to achieve the above objectives, embodiments of a third aspect of the present disclosure provide a terminal, including: one or more processors; a memory; and one or more programs stored in the memory. When the one or more programs are executed by the one or more processors, following operations are performed: receiving a registration request of a user, and providing a registration string to the user; receiving voice information of the registration string read by the user, and generating N voice segments based on the voice information, where N is a positive integer; determining a gender tag of the user based on a gender classification model and the N voice segments; and generating a registration voiceprint model for the user based on the gender tag and the N voice segments.

In order to achieve the above objectives, embodiments of a fourth aspect of the present disclosure provide a storage medium for storing programs configured to perform the method for voiceprint authentication based on artificial intelligence according to embodiments of the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A method and an apparatus for voiceprint authentication based on artificial intelligence according to embodiments of the present disclosure will be described with reference to the drawings as follows.

Figure 1:
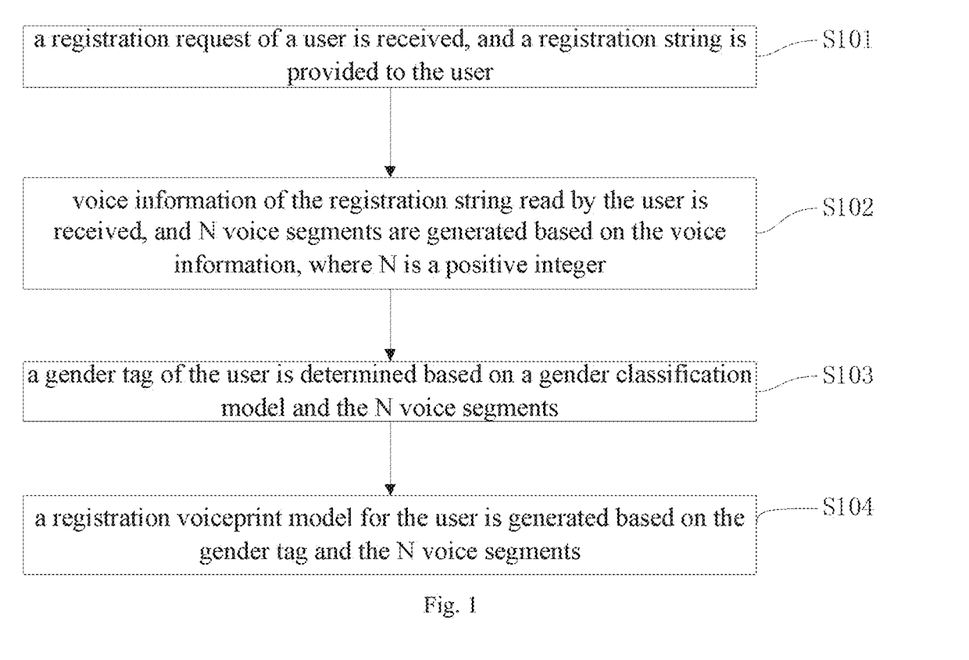
FIG. 1 is a flow chart of a method for voiceprint authentication based on artificial intelligence according to an embodiment of the present disclosure.

FIG. 1 is a flow chart of a method for voiceprint authentication based on artificial intelligence according to an embodiment of the present disclosure. As shown in FIG. 1, the method includes the followings.

At block S101, a registration request of a user is received, and a registration string is provided to the user.

For example, assume that the method for voiceprint authentication based on artificial intelligence according to embodiments of the present disclosure is applied in a login system of a website. When the user opens the website and prepares to register, the user may send a registration request to a login system via a client. After the login system receives the registration request sent by the user via the client, a registration string may be generated randomly, and the registration string may be provided to the user.

It may be understood that there are various forms of registration strings.

As an example, the registration string may be a numerical string generated randomly. Furthermore, in order to cover a large sample space, a numeric character appears only once in the registration string.

As another example, the registration string may be a Chinese character string generated randomly.

At block S102, voice information of the registration string read by the user is received, and N voice segments are generated based on the voice information, where N is a positive integer.

In an embodiment, after the registration string is provided to the user, the user may read aloud the registration string to perform the registration. During a process that the user reads the registration string or after the user reads the registration string, the voice information of the registration string read by the user may be received, and a segmentation may be performed on the voice information so as to acquire N voice segments.

At block S103, a gender tag of the user is determined based on a gender classification model and the N voice segments.

In an embodiment of the present disclosure, a gender classification may be performed on a first voice segment in the N voice segments according to the gender classification model so as to acquire the gender tag.

For example, assume that the method for voiceprint authentication based on artificial intelligence according to embodiments of the present disclosure is applied in a login system of a website. The login system has a voice recognition module and a gender classification model. The gender classification may be performed on the first voice segment in the N voice segments via the gender classification model so as to acquire the gender tag, in which the gender tag includes male or female.

For example, the gender classification model is taken as a Gaussian mixture model. A fundamental-frequency feature and a Mel frequency cepstrum coefficient (MFCC) feature may be extracted from the first voice segment in the N voice segments. After that, a posterior probability computation may be performed on the fundamental-frequency feature and the MFCC feature based on the Gaussian mixture model. A gender of the user may be determined according to the computation result. For example, assuming that the Gaussian mixture model is a male Gaussian mixture model, the gender of the user may be determined as male when the computation result indicates a high posterior probability (for example, greater than a certain threshold), and the gender of the user may be determined as female when the computation result indicates a low posterior probability (for example, smaller than a certain threshold).

At block S104, a registration voiceprint model for the user is generated based on the gender tag and the N voice segments.

In an embodiment of the present disclosure, a corresponding target universal background model UBM may be determined according to the gender tag. After that, a Baum-Welch statistics may be performed on voiceprint features of the N voice segments in a condition of the corresponding target universal background model UBM, and N ivectors of the N voice segments may be extracted. Finally, the registration voiceprint model for the user may be generated according to the N ivectors.

In an embodiment, a target universal background model UBM corresponding to the gender tag may be determined according to the gender tag. After that, the Baum-Welch statistics may be performed on voiceprint features (for example, MFCC feature) of each of the N voice segments in a condition of the target universal background model UBM so as to compute the posterior probability. The posterior probability subjects to a Gaussian distribution, and an expectation of the posterior probability is ivector. For example, a voice $\mu$ is split into L frames of acoustic features $\{y_1, y_2, \ldots, y_L\}$. A dimension of the acoustic features is D. A zero-order Baum-Welch statistics and a first-order Baum-Welch statistics may be performed on the target UBM model $\Omega$ including C indexes of the Gaussian model. The computation process is shown as follows.

$$N_c = \sum_{t=1}^{L} P(c \mid y_t, \Omega) \quad (1)$$

$$F_c = \sum_{t=1}^{L} P(c \mid y_t, \Omega)(y_t - m_c) \quad (2)$$

where c is an index of the Gaussian model and c=1, 2, . . . , C, $P(c|y_t, \Omega)$ is a posterior probability of $y_t$ on a $c^{th}$ index, $m_c$ is an expectation on the $c^{th}$ index. By using following formula (3), ivectors of the voice u may be acquired.

$$\eta = (I + T^t \Sigma^{-1} N T)^{-1} T^t \Sigma^{-1} F \qquad (3)$$

where N is a CD×CD-dimension square matrix with diagonal elements $N_c I$ (c=1, . . . , C), F is a vector of CD×1 by combining all of the first-order statistics $F_c$, T is a transfer matrix of an ivector extractor and $\Sigma$ is a variance matrix of the ivector extractor, $0^t$ represents a matrix transposition, I is a unit matrix. T and $\Sigma$ are acquired by a factor analysis during a training stage, which can be used directly here.

Assuming that during the registering process, there are K sentences in the voice information of the registration string read by the user, K independent ivectors may be extracted from the K sentences respectively. When it is detected that the user reads all of the numerical strings, the K ivectors may be combined to compute a unique ivector for the user, which is used to represent a voiceprint feature of the user as follows.

$$\tilde{\eta} = norm\left(\frac{1}{K} \sum_{k=1}^{K} norm(\eta_k)\right) \qquad (4)$$

where norm( ) represents a length normalization, i.e., a norm of a vector in the parenthesis ( ) is 1. A voiceprint representation manner of $$\tilde{\eta}' = \frac{1}{K} \sum_{k=1}^{K} norm(\eta_k)$$

is also valid. In other words, the above formula (4) may be configured as the registration voiceprint model for the user.

It can be seen that different UBM models may be used in a process for generating the registration voiceprint model for the user. In other words, according to different genders, different UBM models may be used to extract the registration voiceprint mode corresponding to different genders.

With the method for voiceprint authentication based on artificial intelligence according to embodiments of the present disclosure, a registration request of a user is received and a registration string is provided to the user. Then, voice information of the registration string read by the user is received, and N voice segments are generated based on the voice information, where N is a positive integer, and a gender tag of the user is determined based on a gender classification model and the N voice segments. Finally, a registration voiceprint model for the user is generated based on the gender tag and the N voice segments. Therefore, the user may perform the registration via a speech, such that operations of the user may be simplified. Furthermore, in a registering process, by acquiring the gender tag of the user, and then generating a corresponding registration voiceprint model by using different models according to the gender tag, an availability for using a voiceprint password as an authentication manner in a login process may be improved, thereby improving a performance of a voiceprint matching.

Figure 2:
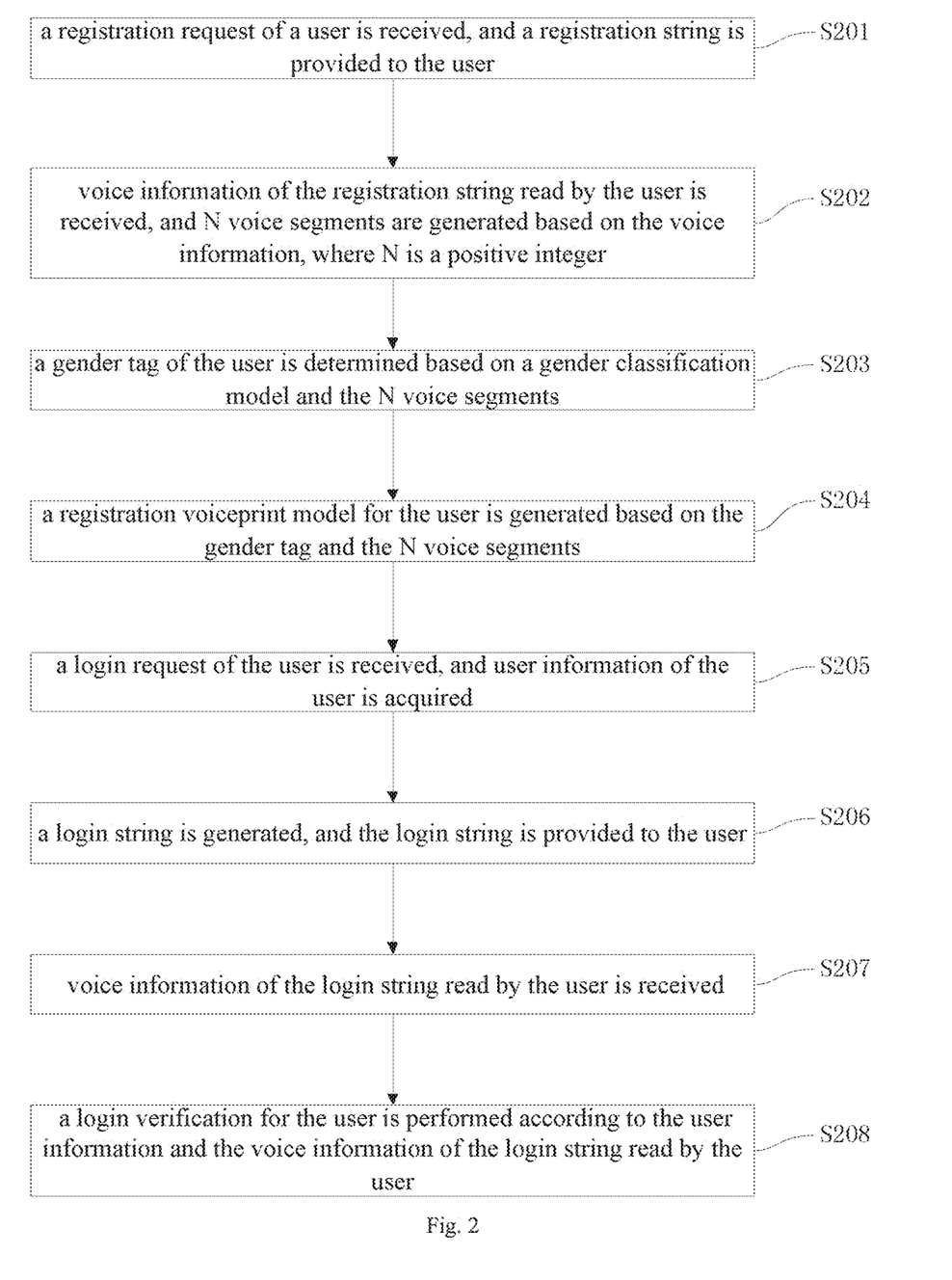
FIG. 2 is a flow chart of a method for voiceprint authentication based on artificial intelligence according to a specific embodiment of the present disclosure.

FIG. 2 is a flow chart of a method for voiceprint authentication based on artificial intelligence according to a specific embodiment of the present disclosure. As shown in FIG. 2, the method for voiceprint authentication based on artificial intelligence may include the followings.

At block S201, a registration request of a user is received, and a registration string is provided to the user.

At block S202, voice information of the registration string read by the user is received, and N voice segments are generated based on the voice information, where N is a positive integer.

At block S203, a gender tag of the user is determined based on a gender classification model and the N voice segments.

In an embodiment of the present disclosure, a gender classification may be performed on a first voice segment in the N voice segments according to the gender classification model so as to acquire the gender tag.

At block S204, a registration voiceprint model for the user is generated based on the gender tag and the N voice segments.

In an embodiment of the present disclosure, a corresponding target universal background model UBM may be determined according to the gender tag. After that, a Baum-Welch statistics may be performed on voiceprint features of the N voice segments in a condition of the corresponding target universal background model UBM, and N ivectors of the N voice segments may be extracted. Finally, the registration voiceprint model for the user may be generated according to the N ivectors.

At block S205, a login request of the user is received, and user information of the user is acquired.

For example, assume that the method for voiceprint authentication based on artificial intelligence according to embodiments of the present disclosure is applied in a login system of a website. When the user opens the website and prepares to register, the user may send a login request to a login system via a client. After the login system receives the login request sent by the user via the client, user information of the user may be acquired. In embodiments of the present disclosure, the user information may include but is not limited to an account/username, a user ID (identity) and the like.

At block S206, a login string is generated, and the login string is provided to the user.

In an embodiment, after the login request of the user is received, a login string may be generated randomly, and the login string may be provided to the user. It may be understood that, in embodiments of the present disclosure, the login string generated randomly may be different from more than one number in the registration string. Furthermore, in order to allow the numerical string said by the user in a login process to be close to the voiceprint feature in the voice information of the registration string as far as possible, each numeric character appears only once in the login string.

At block S207, voice information of the login string read by the user is received.

In an embodiment, after the login string is provided to the user, the user may read aloud the login string. During a process that the user reads the login string or after the user reads the login string, the voice information of the login string read by the user may be received.

At block S208, a login verification for the user is performed according to the user information and the voice information of the login string read by the user.

In an embodiment of the present disclosure, a voice recognition may be performed on the voice information of the login string read by the user so as to acquire text information corresponding to the voice information. After that, it may be determined whether the text information matches with the login string. If yes, a voiceprint matching may be performed on the voice information of the login string read by the user according to the user information. If the voiceprint matching is successfully accomplished, it may be determined that the user passes the login verification.

In an embodiment, after the voice information of the login string read by the user is received, a voice recognition may be performed on the voice information of the login string read by the user so as to acquire corresponding text information. After that, it may be determined whether the text information matches with the login string generated in advance. If no, an error may be returned to the user and a prompt message may be provided to the user to instruct the user to read the login string again. Only when the text information matches with the login string, a voiceprint matching may be performed on the voice information of the login string read by the user according to the user information. If the voiceprint in the voice information matches with a pre-stored voiceprint of the user, it may be determined that the user passes the login verification. Otherwise, it may be considered that the login verification is failed.

Since the login string is a string of numbers, the user may read the string of numbers in one sentence, which means that there may be a voice segment in the generated voice information. In embodiments of the present disclosure, the voice information having a voice segment is taken as an example. A detail process for performing a voiceprint matching on the voice information of the login string read by the user according to the user information may be described as follows. The gender tag and the registration voiceprint model of the user may be acquired according to the user information. After that, a corresponding target universal background model UBM may be determined according to the gender tag, and then a Baum-Welch statistics may be performed on acoustic features in the voice information of the login string read by the user in a condition of the corresponding target universal background model UBM, and an ivector of the voice information may be extracted as a login voiceprint model for the user. Finally, the registration voiceprint model may be compared with the login voiceprint model so as to perform the voiceprint matching.

In an embodiment, in a process of comparing the registration voiceprint model and the login voiceprint model, the login voiceprint model generated in a login process may be compared to the registration voiceprint model generated in a registering process to obtain a comparison score, which can be implemented by a cosine distance, a support vector machine (SVM), a Bayes classifier and GPLDA (Gauss probability linear discriminant analysis) and the like. The comparing process realized by using GPLDA method is described in detail as follows.

Assume that the login voiceprint feature ivector from the verification process is $\eta_1$, and that the registration voiceprint feature ivector from the registering process is $\eta_2$. Therefore, there are two assumptions: $H_1$, both of the ivectors belong to the same person; $H_0$, both of the ivectors belong to different speakers. In this case, a log-likelihood ratio "score" may be represented as follows.

$$\text{score} = \log \frac{P(\eta_1, \eta_2 \mid H_1)}{P(\eta_1 \mid H_d) P(\eta_2 \mid H_d)} \quad (5)$$

where conditional probability distributions of the numerator and the denominator in formula (5) subject to the Gaussian distribution and the expectations of the conditional probability distributions are zero. Thus, log-likelihood ratio "score" may be simplified as follows.

$$\text{score} = \log N\left(\begin{bmatrix}\eta_1\\\eta_2\end{bmatrix}; \begin{bmatrix}0\\0\end{bmatrix}, \begin{bmatrix}\Sigma_{tot} & \Sigma_{ac}\\\Sigma_{ac} & \Sigma_{tot}\end{bmatrix}\right) - \\ \log N\left(\begin{bmatrix}\eta_1\\\eta_2\end{bmatrix}; \begin{bmatrix}0\\0\end{bmatrix}, \begin{bmatrix}\Sigma_{tot} & 0\\0 & \Sigma_{tot}\end{bmatrix}\right) \quad (6)$$

$$= \eta_1^t Q \eta_1 + \eta_2^t Q \eta_2 + 2\eta_1^t P \eta_2 + const$$

where Q, P, $\Sigma_{tot}$ and $\Sigma_{ac}$ in formula (6) are represented as follows.

$$Q = \Sigma_{tot}^{-1} - (\Sigma_{tot} - \Sigma_{ac}\Sigma_{tot}^{-1}\Sigma_{ac})^{-1}$$

$$P = \Sigma_{tot}^{-1}\Sigma_{ac}(\Sigma_{tot} - \Sigma_{ac}\Sigma_{tot}^{-1}\Sigma_{ac})^{-1}$$

$$\Sigma_{tot} = \Phi\Phi^t + \Sigma$$

$$\Sigma_{ac} = \Phi\Phi^t \quad (7)$$

where $\Phi$ and $\Sigma$ are from a training stage of the GPLDA model and may be extracted directly here. The GPLDA model may be represented as follows.

$$f_r = m + \Phi\beta + \varepsilon_r \quad (8)$$

where $\eta_r$ is the observed ivector of $r^{th}$ person, $\beta$ is a real value of the voiceprint for the speaker, which is a hidden variable and cannot be acquired directly. $\Phi$ is a transfer matrix, $\varepsilon_r$ is an observation error which obeys the Gaussian distribution of $N(0,\Sigma)$.

In addition, the voiceprint verification process according to the embodiments of the present disclosure may support a fusion of various classifier scores. In other words, various classifying algorithms may be used in the verification stage. For example, three classifiers including SVM, GPLDA and cosine distance may be used at the same time, and then scores acquired via the three classifiers may be fused so as to acquire a final score.

Furthermore, the voiceprint verification process according to the embodiments of the present disclosure may also support a fusion of various features. In other words, various acoustic features may be extracted and scored by using the same classifier or different classifiers, and then the generated scores are fused. For example, MFCC feature and PLP feature of a voice may be extracted at the same time, and ivectors corresponding to the MFCC feature and the PLP feature respectively may be acquired and further be input into the GPLDA classifier so as to acquire two scores. The two scores are finally fused as one score.

Finally, in a consistency-judging stage of the voiceprint matching process, the obtained score may be compared to a preset threshold. If the obtained score is greater than the preset threshold, it may be considered that the user corresponding to the login voiceprint and the user corresponding to the registration voiceprint are a same speaker (i.e., a same user). In other words, it may be determined that the login verification for the user is successfully accomplished. Otherwise, it may be determined that the login verification is failed.

With the method for voiceprint authentication based on artificial intelligence according to embodiments of the present disclosure, after the registration voiceprint model is generated, the login string may be generated in the login process, and voice information of the login string read by the user may be received, and the login verification for the user may be performed according to the user information and the voice information of the login string read by the user. In the login verification process, the registration voiceprint model is compared to the login voiceprint model so as to perform the voiceprint matching. If the voiceprint for the registration voiceprint model matches with the voiceprint for the login voiceprint model, it may be determined that the verification is successfully accomplished. In other words, the voiceprint model of the user may be created based on the user's gender, such that an availability for using a voiceprint password as an authentication manner in a login process may be improved, thereby improving security of the voiceprint password and user's experience.

In order to achieve the above embodiments, embodiments of the present disclosure also provide an apparatus for voiceprint authentication based on artificial intelligence.

Figure 3:
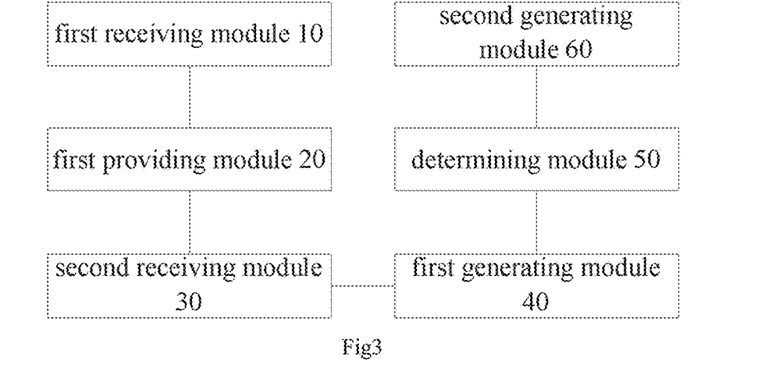
FIG. 3 is a block diagram of an apparatus for voiceprint authentication based on artificial intelligence according to an embodiment of the present disclosure.

FIG. 3 is a block diagram of an apparatus for voiceprint authentication based on artificial intelligence according to an embodiment of the present disclosure. As shown in FIG. 3, the apparatus includes: a first receiving module 10, a first providing module 20, a second receiving module 30, a first generating module 40, a determining module 50 and a second generating module 60.

In an embodiment, the first receiving module 10 may be configured to receive a registration request of a user. The first providing module 20 may be configured to provide a registration string to the user.

For example, assume that the apparatus for voiceprint authentication based on artificial intelligence according to embodiments of the present disclosure is applied in a login system of a website. When the user opens the website and prepares to register, the user may send a registration request to a login system via a client. After the first receiving module 10 receives the registration request sent by the user via the client, a registration string may be generated randomly, and the first providing module 20 may provide the registration string to the user.

It may be understood that there are various forms of registration strings.

As an example, the registration string may be a numerical string generated randomly. Furthermore, in order to cover a large sample space, a numeric character appears only once in the registration string.

As another example, the registration string may be a Chinese character string generated randomly.

The second receiving module 30 may be configured to receive voice information of the registration string read by the user. The first generating module 40 may be configured to generate N voice segments based on the voice information, where N is a positive integer.

In an embodiment, after the registration string is provided to the user by the first providing module 20, the user may read aloud the registration string to perform the registration. During a process that the user reads the registration string or after the user reads the registration string, the second receiving module 30 may receive the voice information of the registration string read by the user, and a segmentation may be performed by the first generating module 40 on the voice information so as to acquire N voice segments.

The determining module 50 may be configured to determine a gender tag of the user based on a gender classification model and the N voice segments. In an embodiment of the present disclosure, the determining module 50 may perform a gender classification on a first voice segment in the N voice segments according to the gender classification model so as to acquire the gender tag.

For example, assume that the method for voiceprint authentication based on artificial intelligence according to embodiments of the present disclosure is applied in a login system of a website. The login system has a voice recognition module and a gender classification model. The gender classification may be performed by the determining module 50 in the login system on the first voice segment in the N voice segments via the gender classification model so as to acquire the gender tag, in which the gender tag includes male or female.

For example, the gender classification model is taken as a Gaussian mixture model. The determining module 50 may extract a fundamental-frequency feature and a Mel frequency cepstrum coefficient MFCC feature from the first voice segment in the N voice segments. After that, a posterior probability computation may be performed on the fundamental-frequency feature and the MFCC feature based on the Gaussian mixture model. A gender of the user may be determined according to the computation result. For example, assuming that the Gaussian mixture model is a male Gaussian mixture model, the gender of the user may be determined as male when the computation result indicates a high posterior probability (for example, greater than a certain threshold), and the gender of the user may be determined as female when the computation result indicates a low posterior probability (for example, smaller than a certain threshold).

The second generating module 60 may be configured to generate a registration voiceprint model for the user based on the gender tag and the N voice segments.

Figure 4:
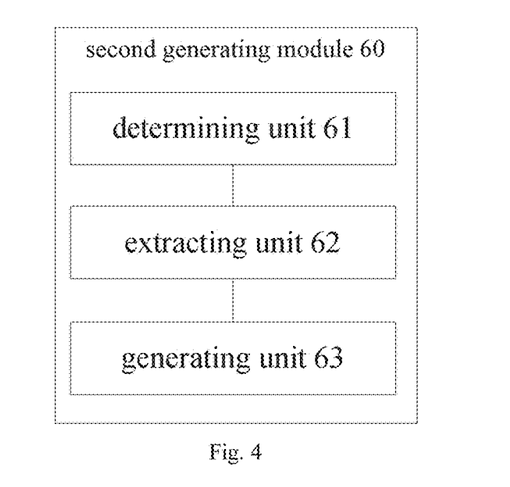
FIG. 4 is a block diagram of a second generating module according to an embodiment of the present disclosure.

In an embodiment of the present disclosure, as shown in FIG. 4, the second generating module 60 may include: a determining unit 61, an extracting unit 62 and a generating unit 63.

The determining unit 61 may be configured to determine a corresponding target universal background model UBM according to the gender tag. The extracting unit 62 may be configured to perform a Baum-Welch statistics on voiceprint features of the N voice segments in a condition of the corresponding target universal background model UBM, and to extract N ivectors of the N voice segments. The generating unit 63 may be configured to generate the registration voiceprint model for the user according to the N ivectors.

In an embodiment, the determining unit 61 may determine a target universal background model UBM corresponding to the gender tag according to the gender tag. After that, the extracting unit 62 may perform the Baum-Welch statistics on voiceprint features (for example, MFCC feature) of each of the N voice segments in a condition of the target universal background model UBM so as to compute the posterior probability. The posterior probability obeys a Gaussian distribution, and an expectation of the posterior probability is ivector. For example, a voice u is split into L frames of acoustic features $\{y_1, y_2, \ldots, y_L\}$. A dimension of the acoustic features is D. A zero-order Baum-Welch statistics and a first-order Baum-Welch statistics may be performed on the target UBM model $\Omega$ including C indexes of the Gaussian model. The computation process is shown as follows.

$$N_c = \sum_{t=1}^{L} P(c \mid y_t, \Omega) \qquad (1)$$

$$F_c = \sum_{t=1}^{L} P(c \mid y_t, \Omega)(y_t - m_c) \quad (2)$$

where c is an index of the Gaussian model and c=1, 2, ..., $P(c|y_t,\Omega)$ is a posterior probability of $y_t$ on a $c^{th}$ index, $m_c$ is an expectation on the $c^{th}$ index. By using following formula (3), ivectors of the voice µ may be acquired.

$$\eta = (I + T'\Sigma^{-1}NT)^{-1}T'\Sigma^{-1}F \quad (3)$$

where N is a CD×CD-dimension square matrix with diagonal elements $N_cI$ (c=1, ..., C), F is a vector of CD×1 by combining all of the first-order statistics $F_c$, T is a transfer matrix of an ivector extractor and Σ is a variance matrix of the ivector extractor, 0′ represents a matrix transposition, I is a unit matrix. T and Σ are acquired by a factor analysis during a training stage, which can be used directly here.

Assuming that during the registering process, there are K sentences in the voice information of the registration string read by the user, K independent ivectors may be extracted from the K sentences respectively. When it is detected that the user reads all of the numerical strings, the generating unit 63 may combine the K ivectors to compute a unique ivector for the user, which is used to represent a voiceprint feature of the user as follows.

$$\tilde{\eta} = norm\left(\frac{1}{K}\sum_{k=1}^{K} norm(\eta_k)\right) \quad (4)$$

where norm( ) represents a length normalization i.e., a norm of a vector in the parenthesis ( ) is 1. A voiceprint representation manner of $$\tilde{\eta}' = \frac{1}{K}\sum_{k=1}^{K} norm(\eta_k)$$

is also valid. In other words, the above formula (4) may be configured as the registration voiceprint model for the user.

It can be seen that different UBM models may be used in a process for generating the registration voiceprint model for the user. In other words, according to different genders, different UBM models may be used to extract the registration voiceprint mode corresponding to different genders.

Figure 5:
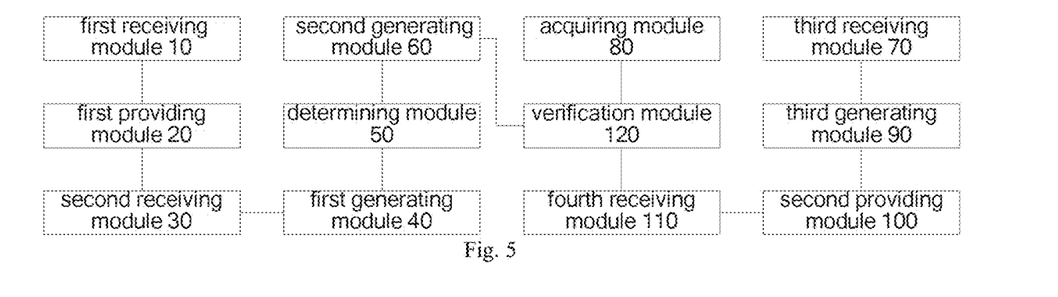
FIG. 5 is a block diagram of an apparatus for voiceprint authentication based on artificial intelligence according to another embodiment of the present disclosure.

Further, in an embodiment of the present disclosure, after the second generating module 60 generates a registration voiceprint model for the user based on the gender tag and the N voice segments, as shown in FIG. 5, the apparatus may also include: a third receiving module 70, an acquiring module 80, a third generating module 90, a second providing module 100, a fourth receiving module 110 and a verification module 120.

The third receiving module 70 may be configured to receive a login request of the user. The acquiring module 80 may be configured to acquire user information of the user.

For example, assume that the apparatus for voiceprint authentication based on artificial intelligence according to embodiments of the present disclosure is applied in a login system of a website. When the user opens the website and prepares to register, the user may send a login request to a login system via a client. After the third receiving module 70 receives the login request sent by the user via the client, user information of the user may be acquired by the acquiring module 80 in the login system. In embodiments of the present disclosure, the user information may include but is not limited to an account/username, a user ID (identity) and the like.

The third generating module 90 may be configured to generate a login string. The second providing module 100 may be configured to provide the login string to the user.

In an embodiment, after the login request of the user is received by the third receiving module 70, a login string may be generated randomly by the third generating module 90, and the login string may be provided to the user by the second providing module 100. It may be understood that, in embodiments of the present disclosure, the login string generated randomly may be different from more than one number in the registration string. Furthermore, in order to allow the numerical string said by the user in a login process to be close to the voiceprint feature in the voice information of the registration string as far as possible, each numeric character appears only once in the login string.

The fourth receiving module 110 may be configured to receive voice information of the login string read by the user. In an embodiment, after the second providing module 100 provides the login string to the user, the user may read aloud the login string. During a process that the user reads the login string or after the user reads the login string, the fourth receiving module 110 may receive the voice information of the login string read by the user.

The verification module 120 may be configured to perform a login verification for the user according to the user information and the voice information of the login string read by the user.

In an embodiment, after the voice information of the login string read by the user is received by the fourth receiving module 110, the verification module 120 may perform a voice recognition on the voice information of the login string read by the user so as to acquire corresponding text information. After that, it may be determined whether the text information matches with the login string generated in advance. If no, an error may be returned to the user and a prompt message may be provided to the user to instruct the user to read the login string again. Only when the text information matches with the voice information, a voiceprint matching may be performed on the voice information of the login string read by the user according to the user information. If the voiceprint in the voice information matches with a pre-stored voiceprint of the user, it may be determined that the user passes the login verification. Otherwise, it may be considered that the login verification is failed.

Figure 6:
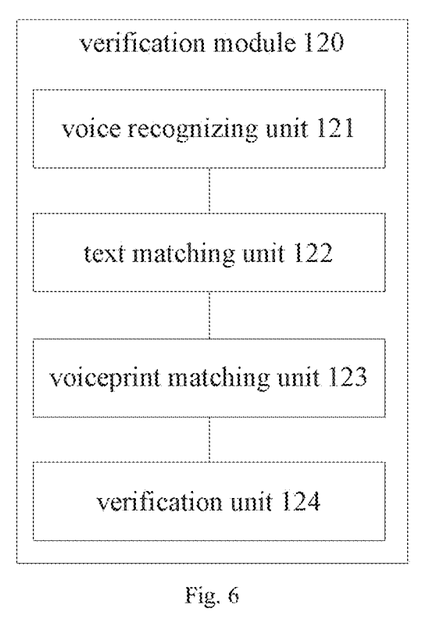
FIG. 6 is a block diagram of a verification module according to an embodiment of the present disclosure.

In an embodiment of the present disclosure, as shown in FIG. 6, the verification module 120 may include: a voice recognizing unit 121, a text matching unit 122, a voiceprint matching unit 123 and a verification unit 124.

The voice recognizing unit 121 may be configured to perform a voice recognition on the voice information of the login string read by the user so as to acquire text information corresponding to the voice information.

The text matching unit 122 may be configured to determine whether the text information matches with the login string.

The voiceprint matching unit 123 may be configured to perform a voiceprint matching on the voice information of the login string read by the user according to the user information if the text information matches with the login string.

Since the login string is a string of numbers, the user may read the string of numbers in one sentence, which means that there may be a voice segment in the generated voice information. In embodiments of the present disclosure, the voice information having a voice segment is taken as an example. The voiceprint matching unit 123 may acquire the gender tag and the registration voiceprint model of the user according to the user information. After that, a corresponding target universal background model UBM may be determined according to the gender tag, and then a Baum-Welch statistics may be performed on acoustic features in the voice information of the login string read by the user in a condition of the corresponding target universal background model UBM, and an ivector of the voice information may be extracted as a login voiceprint model for the user. Finally, the registration voiceprint model may be compared with the login voiceprint model so as to judge whether a voiceprint for the registration voiceprint model matches with a voiceprint for the login voiceprint model.

In an embodiment, in a process of comparing the registration voiceprint model and the login voiceprint model, the login voiceprint model generated in a login process may be compared to the registration voiceprint model generated in a registering process by the voiceprint matching unit 123 to obtain a comparison score. Methods such as a cosine distance, a support vector machine (SVM), a Bayes classifier and GPLDA (Gauss probability linear discriminant analysis) and the like may be applied. The comparing process realized by using GPLDA method is described in detail as follows.

Assume that the login voiceprint feature ivector from the verification process is $\eta_1$, and that the registration voiceprint feature ivector from the registration process is $\eta_2$. Therefore, there are two assumptions: $H_1$, both of the ivectors belong to the same speaker; $H_0$, both of the ivectors belong to the different speakers. In this case, a log-likelihood ratio "score" may be represented as follows.

$$\text{score} = \log \frac{P(\eta_1, \eta_2 \mid H_1)}{P(\eta_1 \mid H_d) P(\eta_2 \mid H_d)} \quad (5)$$

where conditional probability distributions of the numerator and the denominator in formula (5) obey the Gaussian distribution and the expectations of the conditional probability distributions are zero. Thus, log-likelihood ratio "score" may be simplified as follows.

$$\text{score} = \log N \left( \begin{bmatrix} \eta_1 \\ \eta_2 \end{bmatrix} ; \begin{bmatrix} 0 \\ 0 \end{bmatrix}, \begin{bmatrix} \Sigma_{tot} & \Sigma_{ac} \\ \Sigma_{ac} & \Sigma_{tot} \end{bmatrix} \right) - \log N \left( \begin{bmatrix} \eta_1 \\ \eta_2 \end{bmatrix} ; \begin{bmatrix} 0 \\ 0 \end{bmatrix}, \begin{bmatrix} \Sigma_{tot} & 0 \\ 0 & \Sigma_{tot} \end{bmatrix} \right) \quad (6)$$

$$= \eta_1^t Q \eta_1 + \eta_2^t Q \eta_2 + 2 \eta_1^t P \eta_2 + \text{const}$$

where Q, P, $\Sigma_{tot}$ and $\Sigma_{ac}$ in formula (6) are represented as follows.

$$Q = \Sigma_{tot}^{-1} - (\Sigma_{tot} - \Sigma_{ac} \Sigma_{tot}^{-1} \Sigma_{ac})^{-1}$$

$$P = \Sigma_{tot}^{-1} \Sigma_{ac} (\Sigma_{tot} - \Sigma_{ac} \Sigma_{tot}^{-1} \Sigma_{ac})^{-1}$$

$$\Sigma_{tot} = \Phi \Phi^t + \Sigma$$

$$\Sigma_{ac} = \Phi \Phi^t \quad (7)$$

where $\Phi$ and $\Sigma$ are from a training stage of the GPLDA model and may be extracted directly here. The GPLDA model may be represented as follows.

$$f_r = m + \Phi \beta + \varepsilon_r \quad (8)$$

where $\eta_r$ is the observed ivector of $r^{th}$ person, $\beta$ is a real value of the voiceprint for the speaker, which is a hidden variable and cannot be acquired directly. $\Phi$ is a transfer matrix, $\varepsilon_r$ is an observation error which obeys the Gaussian distribution of $N(0,\Sigma)$.

In addition, the voiceprint verification process according to the embodiments of the present disclosure may support a fusion of various classifier scores. In other words, various classifying algorithms may be used in the verification stage. For example, three classifiers including SVM, GPLDA and cosine distance may be used at the same time, and then scores acquired via the three classifiers may be fused so as to acquire a final score.

Furthermore, the voiceprint verification process according to the embodiments of the present disclosure may also support a fusion of various features. In other words, various acoustic features may be extracted and scored by using the same classifier or different classifiers, and then the generated scores are fused. For example, MFCC feature and PLP feature of a voice may be extracted at the same time, and ivectors corresponding to the MFCC feature and the PLP feature respectively may be acquired and are further be input into the GPLDA classifier so as to acquire two scores. The two scores are finally fused as one score.

Finally, in a consistency-judging stage of the voiceprint matching process, the obtained score may be compared to a preset threshold. If the obtained score is greater than the preset threshold, it may be considered that the user corresponding to the login voiceprint and the user corresponding to the registration voiceprint are a same speaker (i.e., a same user). In other words, it may be determined that the login verification for the user is successfully accomplished. Otherwise, it may be determined that the login verification is failed.

The verification unit 124 may be configured to determine that the user passes the login verification if the voiceprint matching unit 123 judges that the voiceprint matching is successfully accomplished.

Thus, after the registration voiceprint model is generated, the login string may be generated in the login process, and voice information of the login string read by the user may be received, and the login verification for the user may be performed according to the user information and the voice information of the login string read by the user. In the login verification process, the registration voiceprint model is compared to the login voiceprint model so as to perform the voiceprint matching. If the voiceprint for the registration voiceprint model matches with the voiceprint for the login voiceprint model, it may be determined that the verification is successfully accomplished. In other words, the voiceprint model of the user may be created based on the user's gender, such that an availability for using a voiceprint password as an authentication manner in a login process may be improved, thereby improving security of the voiceprint password and user's experience.

With the apparatus for voiceprint authentication based on artificial intelligence according to embodiments of the present disclosure, a registration request of a user may be received by a first receiving module, and a registration string may be provided to the user by the first receiving module. Then, voice information of the registration string read by the user may be received by a second receiving module, and N voice segments may be generated by a first generating module based on the voice information, where N is a positive integer, and a gender tag of the user may be determined by the determining module based on a gender classification model and the N voice segments. Finally, a registration voiceprint model for the user may be generated by the second generating module based on the gender tag and the N voice segments. Therefore, the user may perform the registration via a speech, such that operations of the user may be simplified. Furthermore, in a registering process, by acquiring the gender tag of the user, and then generating a corresponding registration voiceprint model by using different models according to the gender tag, an availability for using a voiceprint password as an authentication manner in a login process may be improved, thereby improving a performance of a voiceprint matching.

In order to achieve the above embodiments, the present disclosure also provides a terminal, including: one or more processors; a memory; one or more programs stored in the memory. When the one or more programs are executed by the processor, one or more processors are configured to perform following acts.

At block S101', a registration request of a user is received, and a registration string is provided to the user.

At block S102', voice information of the registration string read by the user is received, and N voice segments are generated based on the voice information, where N is a positive integer.

At block S103', a gender tag of the user is determined based on a gender classification model and the N voice segments.

At block S104', a registration voiceprint model for the user is generated based on the gender tag and the N voice segments.

In order to achieve the above embodiments, the present disclosure also provides a storage medium for storing programs configured to perform parts of or all acts of any method for voiceprint authentication based on artificial intelligence described in embodiments of the present disclosure.

It should be noted that terms such as "first" and "second" are used herein for purposes of description and are not intended to indicate or imply relative importance or significance. Thus, the feature defined with "first" and "second" may comprise one or more this feature. In the description of the present disclosure. "a plurality of" means two or more than two, such as two or three, unless specified otherwise.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

The flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for voiceprint authentication based on artificial intelligence, comprising:
   receiving a registration request of a user, and providing a registration string to the user;
   receiving voice information of the registration string read by the user, and generating N voice segments based on the voice information, where N is a positive integer;
   determining a gender tag of the user based on a gender classification model and the N voice segments; and
   generating a registration voiceprint model for the user based on the gender tag and the N voice segments;
   wherein generating a registration voiceprint model for the user based on the gender tag and the N voice segments comprises:
      determining a corresponding target universal background model (UBM) according to the gender tag;
      performing a Baum-Welch statistics on voiceprint features of the N voice segments in a condition of the UBM, and extracting N ivectors of the N voice segments; and
      generating the registration voiceprint model for the user according to the N ivectors.

2. The method according to claim 1, wherein determining a gender tag of the user based on a gender classification model and the N voice segments comprises:
   performing a gender classification on a first voice segment in the N voice segments according to the gender classification model so as to acquire the gender tag.

3. The method according to claim 2, wherein the gender classification model is a Gaussian mixture model, performing a gender classification on a first voice segment in the N voice segments according to the gender classification model so as to acquire the gender tag comprises:
   extracting a fundamental-frequency feature and a Mel frequency cepstrum coefficient (MFCC) feature from the first voice segment;
   performing a posterior probability computation on the fundamental-frequency feature and the MFCC feature based on the Gaussian mixture model, so as to obtain a computation result; and
   acquiring the gender tag according to the computation result.

4. The method according to claim 1, wherein after generating the registration voiceprint model for the user based on the gender tag and the N voice segments, the method further comprises:
   receiving a login request of the user, and acquiring user information of the user;
   generating a login string, and providing the login string to the user;
   receiving voice information of the login string read by the user; and
   performing a login verification for the user according to the user information and the voice information of the login string read by the user.

5. The method according to claim 4, wherein performing a login verification for the user according to the user information and the voice information of the login string read by the user comprises:
   performing a voice recognition on the voice information of the login string read by the user so as to acquire text information corresponding to the voice information;
   determining whether the text information matches with the login string;
   performing a voiceprint matching on the voice information of the login string read by the user according to the user information if the text information matches with the login string; and
   determining that the user passes the login verification if the voiceprint matching is successfully accomplished.

6. The method according to claim 5, wherein performing a voiceprint matching on the voice information of the login string read by the user according to the user information comprises:
   acquiring the gender tag and the registration voiceprint model of the user according to the user information;
   determining the corresponding target universal background model (UBM) according to the gender tag of the user;
   performing a Baum-Welch statistics on acoustic features in the voice information of the login string read by the user in a condition of the UBM, and extracting an ivector of the voice information as a login voiceprint model for the user; and
   comparing the registration voiceprint model and the login voiceprint model so as to perform the voiceprint matching.

7. The method according to claim 6, wherein comparing the registration voiceprint model and the login voiceprint model so as to perform the voiceprint matching comprises:
   comparing the registration voiceprint model and the login voiceprint model by at least one of a cosine distance, a support vector machine, a Bayes classifier and a Gauss probability linear discriminant analysis to obtain a comparison score for performing the voiceprint matching.

8. The method according to claim 1, wherein performing a Baum-Welch statistics on voiceprint features of the N voice segments in a condition of the UBM, and extracting N ivectors of the N voice segments comprises:
   performing the Baum-Welch statistics on voiceprint features of each of the N voice segments in the condition of the UBM to obtain a posterior probability; and
   determining an expectation of the posterior probability as an ivector when the posterior probability subjects to a Gaussian distribution.

9. An apparatus for voiceprint authentication based on artificial intelligence, comprising:
   one or more processors;
   a memory;
   one or more programs stored in the memory, wherein when the one or more programs are executed by the one or more processors, the one or more processors are configured to:
      receive a registration request of a user, and provide a registration string to the user;
      receive voice information of the registration string read by the user, and generate N voice segments based on the voice information, where N is a positive integer;

determine a gender tag of the user based on a gender classification model and the N voice segments; and
generate a registration voiceprint model for the user based on the gender tag and the N voice segments;
wherein the one or more processors are configured to generate a registration voiceprint model for the user based on the gender tag and the N voice segments by:
    determining a corresponding target universal background model (UBM) according to the gender tag;
    performing a Baum-Welch statistics on voiceprint features of the N voice segments in a condition of the UBM, and to extract N ivectors of the N voice segments; and
    generating the registration voiceprint model for the user according to the N ivectors.

10. The apparatus according to claim 9, wherein the one or more processors are configured to determine a gender tag of the user based on a gender classification model and the N voice segments by:
    performing a gender classification on a first voice segment in the N voice segments according to the gender classification model so as to acquire the gender tag.

11. The apparatus according to claim 10, wherein the gender classification model is a Gaussian mixture model, the one or more processors are configured to perform a gender classification on a first voice segment in the N voice segments according to the gender classification model so as to acquire the gender tag by:
    extracting a fundamental-frequency feature and a Mel frequency cepstrum coefficient (MFCC) feature from the first voice segment;
    performing a posterior probability computation on the fundamental-frequency feature and the MFCC feature based on the Gaussian mixture model, so as to obtain a computation result; and
    acquiring the gender tag according to the computation result.

12. The apparatus according to claim 9, wherein after the registration voiceprint model for the user is generated by the second generating module based on the gender tag and the N voice segments, the one or more processors are further configured to:
    receive a login request of the user;
    acquire user information of the user;
    generate a login string;
    provide the login string to the user;
    receive voice information of the login string read by the user; and
    perform a login verification for the user according to the user information and the voice information of the login string read by the user.

13. The apparatus according to claim 12, wherein the one or more processors are configured to perform a login verification for the user according to the user information and the voice information of the login string read by the user, by:
    performing a voice recognition on the voice information of the login string read by the user so as to acquire text information corresponding to the voice information;
    determining whether the text information matches with the login string;
    performing a voiceprint matching on the voice information of the login string read by the user according to the user information if the text information matches with the login string; and
    determining that the user passes the login verification if the voiceprint matching unit judges that the voiceprint matching is successfully accomplished.

14. The apparatus according to claim 13, wherein the one or more processors are configured to perform a voiceprint matching on the voice information of the login string read by the user according to the user information by:
    acquiring the gender tag and the registration voiceprint model of the user according to the user information;
    determining the corresponding target universal background model (UBM) according to the gender tag of the user;
    performing a Baum-Welch statistics on acoustic features in the voice information of the login string read by the user in a case of the UBM, and extracting an ivector of the voice information as a login voiceprint model for the user; and
    comparing the registration voiceprint model and the login voiceprint model so as to perform the voiceprint matching.

15. The apparatus according to claim 14, wherein the one or more processors are configured to compare the registration voiceprint model and the login voiceprint model so as to perform the voiceprint matching by:
    comparing the registration voiceprint model and the login voiceprint model by at least one of a cosine distance, a support vector machine, a Bayes classifier and a Gauss probability linear discriminant analysis to obtain a comparison score for performing the voiceprint matching.

16. The apparatus according to claim 9, wherein the one or more processors are configured to perform a Baum-Welch statistics on voiceprint features of the N voice segments in a condition of the UBM, and extracting N ivectors of the N voice segments by:
    performing the Baum-Welch statistics on voiceprint features of each of the N voice segments in the condition of the UBM to obtain a posterior probability; and
    determining an expectation of the posterior probability as an ivector when the posterior probability subjects to a Gaussian distribution.

17. A storage medium for storing programs configured to perform the method for voiceprint authentication based on artificial intelligence comprising:
    receiving a registration request of a user, and providing a registration string to the user;
    receiving voice information of the registration string read by the user, and generating N voice segments based on the voice information, where N is a positive integer;
    determining a gender tag of the user based on a gender classification model and the N voice segments; and
    generating a registration voiceprint model for the user based on the gender tag and the N voice segments;
    wherein generating a registration voiceprint model for the user based on the gender tag and the N voice segments comprises:
        determining a corresponding target universal background model (UBM) according to the gender tag;
        performing a Baum-Welch statistics on voiceprint features of the N voice segments in a condition of the UBM, and extracting N ivectors of the N voice segments; and
        generating the registration voiceprint model for the user according to the N ivectors.

* * * * *